United States Patent
Vanderspurt et al.

(10) Patent No.: US 10,099,797 B2
(45) Date of Patent: Oct. 16, 2018

(54) ENDOTHERMIC CRACKING AIRCRAFT FUEL SYSTEM

(71) Applicant: United Technologies Corporation, Hartford, CT (US)

(72) Inventors: Thomas Henry Vanderspurt, Brick, NJ (US); Zissis A. Dardas, Worcester, MA (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 506 days.

(21) Appl. No.: 14/844,101

(22) Filed: Sep. 3, 2015

(65) Prior Publication Data

US 2015/0375869 A1 Dec. 31, 2015

Related U.S. Application Data

(60) Continuation of application No. 13/198,741, filed on Aug. 5, 2011, now Pat. No. 9,150,300, which is a division of application No. 11/507,382, filed on Aug. 21, 2006, now Pat. No. 8,015,823.

(51) Int. Cl.
| | |
|---|---|
| *F02C 1/00* | (2006.01) |
| *B64D 37/34* | (2006.01) |
| *B64C 3/36* | (2006.01) |
| *C10G 11/00* | (2006.01) |
| *C10G 51/02* | (2006.01) |

(52) U.S. Cl.
CPC ............... *B64D 37/34* (2013.01); *B64C 3/36* (2013.01); *C10G 11/00* (2013.01); *C10G 51/026* (2013.01)

(58) Field of Classification Search
CPC ... F02C 7/224; F02C 7/14; F02C 3/20; B64D 37/30; B64D 37/34; F23R 3/40; C06D 5/04
See application file for complete search history.

(56) References Cited

U.S. PATENT DOCUMENTS

| | | |
|---|---|---|
| 2,439,934 A | 4/1948 | Johnson et al. |
| 2,979,293 A | 4/1961 | Mount |
| 3,438,602 A | 4/1969 | Noddings et al. |
| 3,505,204 A | 4/1970 | Hoffman |
| 3,739,581 A | 6/1973 | Talmor |
| 3,846,288 A | 11/1974 | Chun et al. |
| 4,372,755 A | 2/1983 | Tolman et al. |
| 4,509,333 A | 4/1985 | Nussdorfer et al. |
| 4,776,536 A * | 10/1988 | Hudson .................. B64D 37/34 244/117 A |
| 5,232,672 A | 8/1993 | Spadaccini et al. |
| 5,267,608 A | 12/1993 | Coffinberry |

(Continued)

*Primary Examiner* — Gerald L Sung

(74) *Attorney, Agent, or Firm* — Carlson, Gaskey & Olds, P.C.

(57) ABSTRACT

A method of controlling cooling in an aircraft system includes endothermically cracking a fuel to increase its cooling capacity using a catalyst that includes at least one transition metal compound of at least one of carbides, nitrides, oxynitrides, oxycarbonitrides, oxycarbides, phosphides, and combinations, and the transition metal includes at least one of zirconium, hafnium, tantalum, niobium, molybdenum, tungsten, platinum, palladium, rhodium, iridium, ruthenium, osmium, rhenium, and combinations thereof. The cracked fuel is used to cool a heat source that includes an aircraft component.

13 Claims, 1 Drawing Sheet

(56) References Cited

U.S. PATENT DOCUMENTS

| | | | |
|---|---|---|---|
| 5,313,790 A * | 5/1994 | Barr | F02C 7/14 |
| | | | 60/267 |
| 5,392,595 A | 2/1995 | Glickstein et al. | |
| 5,414,992 A * | 5/1995 | Glickstein | B64D 13/006 |
| | | | 60/39.83 |
| 5,805,973 A * | 9/1998 | Coffinberry | B01J 19/02 |
| | | | 123/668 |
| 6,071,402 A | 6/2000 | Danot et al. | |
| 6,145,501 A | 11/2000 | Manohar et al. | |
| 6,357,217 B1 * | 3/2002 | Griffin | F02C 7/16 |
| | | | 60/39.12 |
| 6,647,707 B2 | 11/2003 | Dev | |
| 2004/0052725 A1 * | 3/2004 | Niu | B01J 23/63 |
| | | | 423/651 |
| 2004/0086432 A1 | 5/2004 | LaBarge et al. | |
| 2004/0120878 A1 * | 6/2004 | Mayes, Jr. | B01J 8/26 |
| | | | 423/418.2 |
| 2004/0150312 A1 | 8/2004 | McElrath et al. | |
| 2005/0201906 A1 | 9/2005 | Alvin et al. | |
| 2005/0204919 A1 | 9/2005 | Spadaccini et al. | |
| 2005/0210881 A1 | 9/2005 | Balan et al. | |
| 2006/0064987 A1 | 3/2006 | Veninger | |
| 2006/0080967 A1 | 4/2006 | Colket, III | |
| 2007/0006594 A1 | 1/2007 | Bakos et al. | |
| 2007/0130956 A1 | 6/2007 | Chen | |
| 2007/0212538 A1 | 9/2007 | Niu | |
| 2007/0261714 A1 * | 11/2007 | Huang | B08B 9/027 |
| | | | 134/22.1 |
| 2008/0138273 A1 * | 6/2008 | Jiang | B01J 12/007 |
| | | | 423/645 |

* cited by examiner

ENDOTHERMIC CRACKING AIRCRAFT FUEL SYSTEM

REFERENCE TO RELATED APPLICATIONS

This application is a Continuation of U.S. patent application Ser. No. 13/198,741, filed Aug. 5, 2011, which is a Divisional of U.S. patent application Ser. No. 11/507,382, filed on Aug. 21, 2006, now U.S. Pat. No. 8,015,823.

BACKGROUND OF THE INVENTION

This disclosure relates to aircraft fuel systems and, more particularly, to increasing a cooling capacity of fuel within the fuel system to cool heat-producing aircraft components.

Fuel is widely known and used in the aircraft industry as a heat sink before combustion for cooling heat-producing aircraft components. For example, in aircraft having gas turbine engines, the fuel is used to cool bleed air from an engine compressor in a cabin air cycle control system, heat-producing aircraft components in a thermal management system, or an engine turbine in a turbine film cooling system.

To extend the usefulness of the fuel as a coolant, there have been proposals to treat the fuel to increase the cooling capacity. For example, the cooling capacity of dissolved oxygen-rich fuel is limited because the oxygen initiates formation of deposits commonly referred to as "coke" or "coking" at temperatures between 350° F. and 850° F. Typically, lowering the oxygen concentration overcomes the coking problem and allows the fuel to be heated without significant coking. Thus, an oxygen-depleted or "deoxygenated" fuel can be heated to a higher temperature without coking to provide increased cooling capacity.

For some aircraft, an even greater cooling capacity is desired. For example, hypersonic aircraft or other types of propulsion devices, components or engines (e.g., scramjet engines) may operate at temperatures near or above 850° F. and up to about 1700° F. At such temperatures, the traditional fuel treatment may not provide fuel having enough cooling capacity to cool the aircraft components or engine to a desired temperature without coking. Therefore, there is a need for a fuel system and method for increasing the cooling capacity of the fuel.

SUMMARY OF THE INVENTION

A method of controlling cooling in an aircraft system according to an example of the present disclosure includes endothermically cracking a fuel to increase its cooling capacity using a catalyst that includes at least one transition metal compound of at least one of carbides, nitrides, oxynitrides, oxycarbonitrides, oxycarbides, phosphides, and combinations thereof. The transition metal includes at least one of zirconium, hafnium, tantalum, niobium, molybdenum, tungsten, platinum, palladium, rhodium, iridium, ruthenium, osmium, rhenium, and combinations thereof. The cracked fuel is used to cool a heat source comprising an aircraft component.

In a further embodiment of any of the forgoing embodiments, the endothermic cracking includes cleaving carbon-to-carbon bonds of the fuel.

In a further embodiment of any of the forgoing embodiments, the carbon-to-carbon bonds are of non-aromatic hydrocarbon chains of the fuel.

In a further embodiment of any of the forgoing embodiments, the endothermic cracking includes dehydrogenation of the fuel.

In a further embodiment of any of the forgoing embodiments, the endothermic cracking includes endothermically cracking a pre-selected type of a compositional constituent of the fuel to absorb a first amount of heat and to produce a product compositional constituent.

In a further embodiment of any of the forgoing embodiments, the endothermic cracking includes endothermically cracking the product compositional constituent to absorb a second amount of heat.

In a further embodiment of any of the forgoing embodiments, the endothermic cracking includes endothermically cracking the predetermined type of the compositional constituent using a first catalyst section having a first transition metal and endothermically cracking the product compositional constituent using a second catalyst section having a second, different transition metal.

A further embodiment of any of the foregoing embodiments includes regenerating the catalyst to increase catalytic activity.

In a further embodiment of any of the forgoing embodiments, the regenerating includes adding an oxygenate or a nitrogen-containing compound to the fuel as a source of, respectively, oxygen or nitrogen for regenerating the catalyst.

In a further embodiment of any of the forgoing embodiments, the transition metal compound further includes a metal selected from the group consisting of aluminum, scandium, titanium, vanadium, chromium, manganese, silicon, thorium, and combinations thereof.

In a further embodiment of any of the forgoing embodiments, the transition metal is selected from the group consisting of tantalum, niobium, molybdenum, tungsten, and combinations thereof.

In a further embodiment of any of the forgoing embodiments, the catalyst includes at least one of niobium oxynitride, niobium oxycarbide, and molybdenum oxynitride.

In a further embodiment of any of the forgoing embodiments, the endothermic cracking includes endothermically cracking a predetermined type of a compositional constituent using a first catalyst section having at least one of niobium oxynitride or niobium oxycarbide to produce a product compositional constituent, and endothermically cracking the product compositional constituent using a second catalyst section having molybdenum oxynitride.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
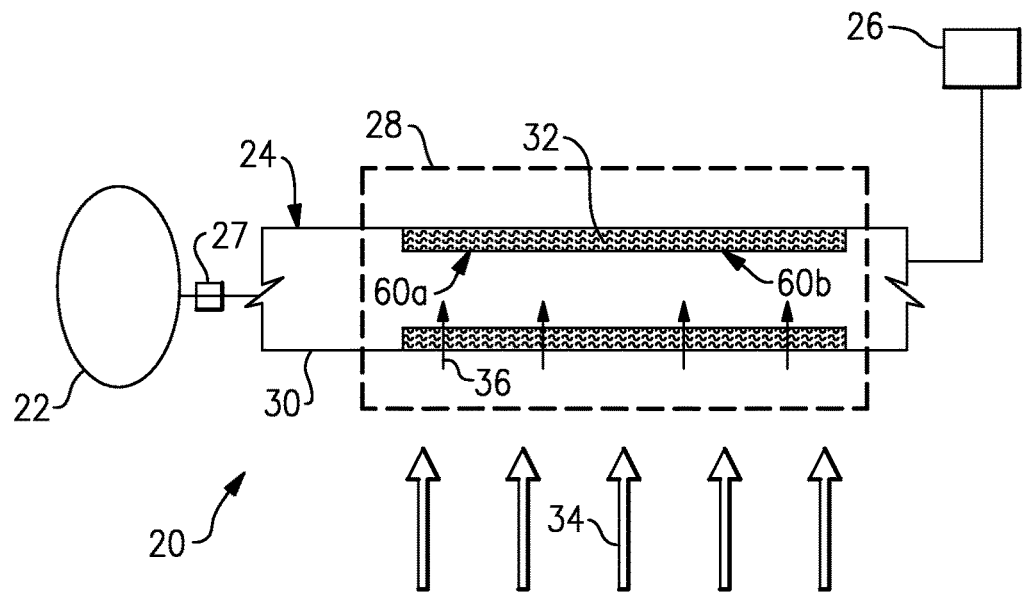
FIG. 1 schematically illustrates an example aircraft fuel system having a fuel passage that extends through an aircraft wing.

FIG. 1 illustrates selected portions of an example aircraft fuel system 20 for increasing a cooling capacity of an aircraft fuel. In this example, the aircraft fuel system 20 includes a storage portion 22 for storing the aircraft fuel. The aircraft fuel is conveyed through a fuel passage 24 to aircraft engine 26, such as a scramjet engine. A fuel stabilization unit 27, such as a fuel deoxygenator, associated with the fuel passage 24 removes oxygen from the fuel. In this example, the fuel passage 24 extends within an aircraft wing 28 to cool the aircraft wing 28.

The fuel passage 24 includes walls 30 that define the passage for the aircraft fuel. A catalyst 32 adjacent the walls 30 endothermically cracks the aircraft fuel to increase the cooling capacity of the fuel for absorbing heat from the aircraft wing 28. The term "crack" or "cracking" as used in this description refers to decomposing a molecule or molecules into lighter molecules. The decomposition reaction absorbs heat to thereby increase the amount of heat that the aircraft fuel absorbs from a heat source. In the illustrated example, air 34 traveling across the aircraft wing 28 frictionally heats the aircraft wing 28. The aircraft fuel passing through the fuel passage 24 absorbs the heat 36 to control the temperature of the aircraft wing 28.

Figure 2:
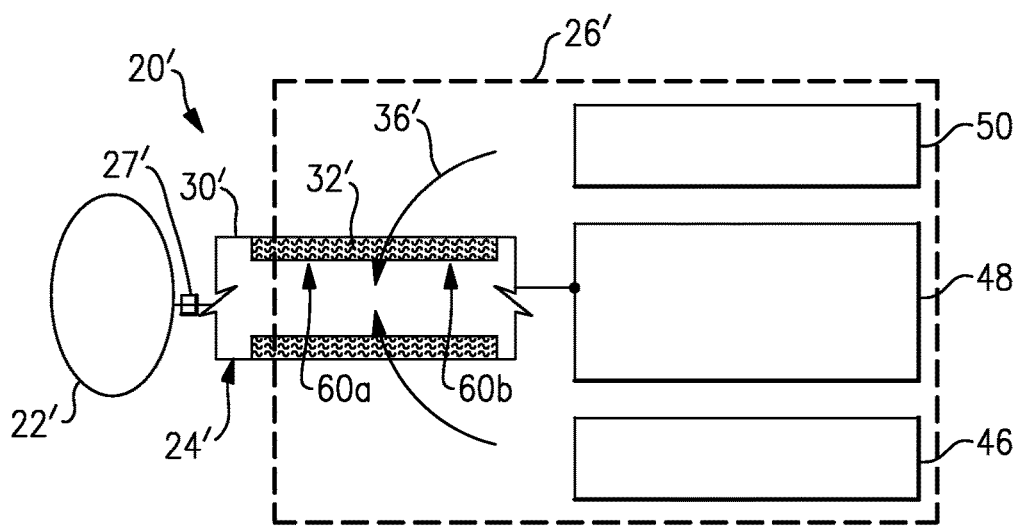
FIG. 2 schematically illustrates a second embodiment of an aircraft fuel system having a fuel passage within an aircraft engine.

FIG. 2 illustrates selected portions of another example aircraft fuel system 20'. In this example, the aircraft fuel system 20' includes a fuel storage portion 22' for storing aircraft fuel. The aircraft fuel is conveyed through a fuel passage 24' to an aircraft engine 26', such as a scramjet engine. A fuel stabilization unit 27', such as a fuel deoxygenator, associated with the fuel passage 24 removes oxygen from the fuel. In the illustrated example, the aircraft engine 26' includes a compression section 46, a combustion section 48, and an exhaust section 50 that operate in a known manner to propel an aircraft. In this example, the fuel passage 24' conveys the aircraft fuel from the fuel storage portion 22' to the combustor section 48.

The fuel passage 24' includes walls 30' that define the passageway for the aircraft fuel. In the illustrated example, a catalyst 32' adjacent the walls 30' endothermically cracks the aircraft fuel to increase the cooling capacity of the fuel for absorbing heat 36' from the aircraft engine 26'. In one example, the heat 36' is produced by the compressor section 46, the combustor section 48, the exhaust section 50, components associated with these sections, or combinations thereof. Additionally, in this example, the fuel passage 24' is located relatively close to the aircraft engine 26' such that nascent coke or coking precursors that may form as a result of the additional absorbed heat may not have time to polymerize before the aircraft fuel is conveyed into the combustion section 48. Furthermore, even if a limited amount of coking occurs in the disclosed examples, the catalyst 32, 32' provides the benefit of resisting or preventing the coke from adhering to the walls 30, 30'.

The cracking reactions of the disclosed examples, such as cleaving of carbon-to-carbon bonds or dehydrogenation, have an associated ΔH of reaction. For example, table 1 below shows ΔH values for a variety of example cleaving and dehydrogenation reactions. Thus, for a given aircraft fuel having a known composition, one can determine or estimate the amount of additional heat that the aircraft fuel can absorb (i.e., cooling capacity) from cracking reactions.

| Reaction | ΔH (77 F.) (Btu/lb) |
|---|---|
| Dehydrogenation of straight chains $C_4H_{10} \rightarrow C_4H_6 + 2H_2$ | 1745 |
| Dehydrogenation of cyclics | 1050 |

-continued

| Reaction | ΔH (77 F.) (Btu/lb) |
|---|---|
| $C_6H_{12} \rightarrow C_6H_6 + 3H_2$ Ring Fracture of Aromatics | 3290 |
| $c - C_6H_6 \rightarrow 3C_2H_2$ De-dimerization | 270 |
| dicyclopentadiene $\rightarrow 2c - C_5H_6$ Dehydrocyclization | 1020 |
| $C_7H_{16} \rightarrow$ toluene $+ 4H_2$ Dehydrogenation/de-dimerization | 1035 |
| JP-10 $\rightarrow 2c - C_5H_6 + 2H_2$ | |

In the disclosed examples, the catalyst 32, 32' includes a transition metal selected from zirconium, hafnium, tantalum, niobium, molybdenum, tungsten, rhenium, and combinations thereof. In a further example, one or more selected ones of the transition metals are used as a transition metal compound that includes an carbide, nitride, oxynitride, oxycarbonitride, oxycarbide, phosphide or combination thereof.

In one example, the oxycarbide, oxynitride or oxycarbonitride structure is further promoted or tuned by the addition of elements selected from the group aluminum, scandium, titanium, vanadium, chromium, manganese, silicon, thorium, and combinations thereof to impart additional characteristics as desired, such as increased activity or to inhibit sintering.

In another example, other elements selected from platinum, palladium, rhodium, iridium, ruthenium, osmium, and combinations thereof are used in the composition to promote lower temperature "light-off" or sulfur tolerance.

In one example, the transition metal is tantalum, niobium, molybdenum, tungsten or combinations thereof used as a compound (e.g., oxynitride). These example transition metals provide the benefit of catalytic bi-functionality. For example, catalysts 32, 32' include acid catalytic sites and dehydrogenation catalytic sites. In one example, the acid catalytic sites include a non-metallic atom, such as oxygen, within a nanostructure lattice formed by the catalyst 32, 32' and the dehydrogenation catalytic sites include a metallic atom within the nanostructure lattice of the catalyst 32, 32'. The acid catalytic sites function in cracking reactions to cleave carbon-to-carbon bonds within the aircraft fuel. The dehydrogenation catalytic sites function to cleave hydrogen atoms off of hydrocarbons within the aircraft fuel. Furthermore, the disclosed catalytic materials provide the advantage of thermodynamic stability over desired periods of time at severely elevated temperatures, such as between 850° F. and 2000° F. where conventional types of catalysts become unstable.

In a further example, the catalyst 32, 32' includes niobium oxynitride ($NbN_xO_y$) or niobium oxycarbide ($NbC_xO_y$). These are thought to be suitable for use with shale oil fuels to produce multiple types of cracking reactions. It is believed that niobium oxynitride and niobium carbide are particularly effective in cracking shale oil fuels through carbon-to-carbon cleaving and dehydrogenation reactions for augmenting the cooling capacity of the aircraft fuel.

The insertion of carbon, nitrogen, or phosphorous into the nanostructure lattice of the transition metal compound increases the lattice parameter $a_o$ (e.g., for Nb $a_o$=330.6 pm, NbN $a_o$=439.2 pm, and for NbC $a_o$=447.0 pm) to thereby decrease the d band as $(a_o)^{-5}$. This increases the density of d electronic states at the Fermi level. Therefore, the catalytic properties of the Group 4, 5 and 6 transition metals shift to the right behaving more like Groups 8, 9 and 10 transition metals.

In one example, the catalyst 32, 32' is selected to augment the cooling capacity of a given, predetermined type of aircraft fuel. For example, the aircraft fuel may have a composition of non-aromatic hydrocarbon chains. The catalyst 32, 32' dehydrogenates the hydrocarbon chain to produce a hydrogen molecule and an adsorbed olefin. The olefin then cracks (i.e., cleaving of one or more carbon-to-carbon bonds) at an acid catalytic site. If one of the remaining hydrocarbon chains is between six and eight carbon atoms in length, it cyclizes and, with the assistance of a hydrogenation/dehydrogenation site, becomes an aromatic (e.g., benzene $C_6$, toluene $C_7$, or a xylenes $C_8$). The cracking of the non-aromatic hydrocarbon chain results in absorption of heat that is approximately proportional to the ΔH of reaction for cleaving the type of non-aromatic hydrocarbon chain. The aircraft fuel absorbs another amount of heat that is approximately proportional to the ΔH of reaction for the dehydrogenation of the aromatic hydrocarbon product. Thus, in this example, the catalyst 32, 32' provides the benefit of cracking multiple constituents within the aircraft fuel to augment the amount of heat that the aircraft fuel can absorb and thereby increase the cooling capacity of the aircraft fuel.

Optionally, the catalyst 32, 32' includes a first catalyst section 60a and a second catalyst section 60b (FIGS. 1 and 2). The first catalyst section 60a is located upstream from the second catalyst section 60b. In this example, the catalyst 32, 32' of the first catalyst section 60a includes a first transition metal and the catalyst 32, 32' of the second catalyst section 60b includes a different, second transition metal (e.g., from those mentioned above). In one example, one or both of the catalysts 32, 32' of the first catalyst section 60a and the second catalyst section 60b are transition metal carbides, nitrides, oxynitrides, oxycarbonitrides, oxycarbides, phosphides or combinations thereof. The different transition metals selectively crack different types of compositional constituents or are particularly suited for certain types of cracking reactions (e.g., cleaving carbon-to-carbon bonds, dehydrogenation, etc.). This provides the benefit of tailoring the activity of the catalyst 32, 32' along the length of the fuel passage 24. For example, the first catalyst section 60a cracks the aircraft fuel into a constituent product and the second catalyst section 60b cracks the constituent product downstream to augment the amount of heat absorbed by the aircraft fuel.

In one example, the first catalyst section 60a is located in a relatively lower temperature area than the second catalyst section 60b. The area may be separated or adjacent as shown. In this example, the catalyst 32, 32' of the first catalyst section 60a includes a catalyst material suitable for operation at the relatively lower temperature. For example, the catalyst 32, 32' of the first catalyst section 60a includes a zeolite type catalyst having an aluminum oxide or, alumino-silicate material. This provides the benefit of tailoring the activity of the catalyst 32, 32' along the length of the fuel passage 24, depending on the expected temperatures in the locations of the catalysts 32, 32'. Alternatively, more than two catalyst sections are used as taught above to crack a plurality of constituent products over a plurality of sections having differing temperature to tailor the activity of the catalyst 32, 32' along the fuel passage 24. Given this description, one of ordinary skill in the art will recognize alternative arrangements to suit their particular needs.

Alternatively, or in addition to having different transition metals in the first catalyst section 60a and the second catalyst section 60b, a ratio of acid catalytic sites to dehydrogenation catalytic sites is selected to augment the cooling capacity. In one example, the ratio in the first catalytic section 60a differs from the ratio in the second catalytic section 60b. Depending upon the type of aircraft fuel, a higher ratio of acid catalytic sites may be desired within the first catalyst section 60a to promote more cleaving of the carbon-to-carbon bonds. Downstream in the second catalyst section 60b, a greater number of dehydrogenation catalyst sites may be desired to dehydrogenize the constituent products resulting from the reaction at the first catalyst section 60a. Thus, the types of transition metals used, the ratio of acid catalytic sites to hydrogenation catalytic sites, or both, may be varied along the length of the catalyst 32, 32' within the fuel passage 24 to achieve a desired amount of heat absorption.

In one example, the first catalyst section 60a includes either niobium oxynitride or niobium oxycarbide, as described above, and the second catalyst section 60b includes molybdenum oxynitride ($MoN_xO_y$). In this example, the niobium oxynitride or niobium oxycarbide has a greater ratio of acid catalytic sites than the molybdenum oxynitride, and the molybdenum oxynitride has a greater ratio of dehydrogenation catalytic sites than the niobium oxides.

Furthermore, the types of transition metals selected and the ratio of catalytic sites may be selected based upon the type of fuel expected to be used. For example, certain transition metals or combinations thereof may be most suitable for one or more type of fuel such as petroleum fuels (e.g., paraphenic fuel, naphthenic fuel) having relatively large concentrations of ringed structures, Fischer-Tropes fuel having relatively large concentration of non-aromatic, hydrocarbon chains, certain shale oil fuels having relatively high concentration of ringed hydrocarbons, or bio-fuels having relatively high concentrations of non-aromatic hydrocarbon chains with unsaturation (e.g., $C_{16}$ fatty acid esters).

Additionally, the expected environmental temperatures may be taken into account when selecting the catalyst 32, 32'. For example, catalyst materials having relatively higher melting temperatures may be better suited for higher temperature environments. To list a few examples, the melting temperatures of molybdenum nitride, molybdenum carbide, tungsten carbide, and tungsten nitride are 1750° C., 2692° C., 2780° C., and about 2000° C., respectively. Given this description, one of ordinary skill in the art will be able to determine which types of catalysts are suitable for their particular needs.

In the disclosed examples, the above-mentioned catalysts 32, 32' also include a desirable porosity to provide the benefit of operational stability and resistance to coking. In one example, the porosity of the catalysts 32, 32' is tailored to minimize mass transfer resistance typified by 1.5-10 nm pores while achieving a favorable coke solubilization in <1 nm pores.

In some catalyst systems, such as zeolite systems, it has been observed by in situ Cylindrical Internal Reflectance FTIR (CIR-FTIR) that the density of the hydrocarbon fuel within the zeolitic micropores was liquid-like and at least one order of magnitude higher than that that predicted by the thermodynamics (equation of state) under supercritical state. This is attributed to a "condensation-type" effect that is further enhanced by the supercritical state, which alters the nature of carbon-hydrogen chemical bonds in the molecules (broadening in the spectrum peaks for the carbon-hydrogen stretching bonds). Stabilization of the catalyst against deactivation by coke formation was observed for these supercritical processing conditions, resulting in a practically stable catalyst for long operation times.

The hydrocarbon "condensation-type" effect in the catalyst micropores for a given set of supercritical processing conditions is a function of primarily two parameters: 1) the diameter of the catalyst micropore and 2) the local electric field in the catalyst micropore as defined in the case of the zeolites by the Si/Al ratio and the cation electric charge and effective diameter. Thus, the stabilization of a catalyst against deactivation by coke formation can be controlled, at least in part, by utilizing ≤1.5 nm diameter pores that promote the hydrocarbon "condensation-type" effect to solubilize coke and coke precursors. In one example, pores of the catalysts 32, 32' are interconnected in a pore network with up to about 20% of the surface area in pores ≤1.5 nm in diameter, about 20-30% of the surface area in pores between about 1.5 nm and 3 nm, about 40% or more of the surface area in pores between 3 nm and 6 nm with the balance in pores greater than 6 nm in diameter (mass transfer resistance depends on the pore diameter to the −1.5 power). An excess of large pores (those >6 nm in diameter) will tend to decrease the density of the supercritical fuel toward the predicted thermodynamic value (i.e., for this example that is gaseous). That is, the coke and coke precursor solubilization efficiency is limited by an excess of large pores and the catalysts 32, 32' will lose the initially higher activity rather rapidly. Given this description, one of ordinary skill in the art will recognize other desirable porosities suited for their particular needs.

A desirable porosity (e.g., fractal pore structure) may be used in combination with an appropriately balanced number and type of active sites on the walls of these pores (i.e., and appropriate ratio of acid and hydrogenation/dehydrogenation sites). This balance furthermore is a function of the fuel type and the operating temperature.

In the disclosed examples, the catalyst 32, 32' generally decreases in catalytic activity as the catalytic sites are used up in the cracking reactions. In one example, a carbon atom replaces the atom of the catalytic site such that the catalytic site has reduced catalytic activity. Over a period of time, the overall catalytic activity of the catalyst 32, 32' is reduced in this manner. In one example, a controlled amount water is added to the aircraft fuel to regenerate the catalytic sites. Under high pressure within the fuel passage 24, the water provides a source of oxygen for regenerating the catalytic sites. For example, an oxygen atom replaces the carbon atom at the catalytic site to increase the catalytic activity of the catalytic site. Optionally, the water is injected under pressure into the aircraft fuel to selectively regenerate the catalyst 32, 32' at a desired time, such as at an interval over a long flight. Alternatively, other regenerating fluids are used in addition to or instead of water. In one example, the regenerating fluid includes an ammonia/water mixture, acetonitrile, methanol, dimethyl ether, ethanol, amino alcohol, or other oxygenate. The addition of nitrogen compounds like ammonia is counter intuitive as nitrogen bases typically poison active sites, however in this instance the acid sites depend in part of the presence oxynitrides that may be reacted away and replaced with carbides unless restored through the judicious addition of nitrogen and oxygen in the proper form.

In the disclosed examples, the catalyst 32, 32' is disposed on or near the walls 30, 30' of the fuel passage 24 in any of a variety of known methods. In one example, the walls 30, 30' are pretreated with oxygen and steam to oxidize the surfaces thereof. This provides the benefit of producing an oxide layer on the walls for better adhesion with the catalyst 32, 32'.

The pretreated walls 30, 30' are then wash-coated with a suspension of nano-sized catalytic precursor particles, such as transition metal oxides. The particles, or individual crystallites or proto-crystallites or the oxide or proto oxide, are approximately less than 5 nm in size and forms porous particles on the order of 50 to 200 nm in diameter. In one example, the washcoat includes pores that are approximately 2 nm or larger in diameter and a surface area of greater than about 800 m$^2$/g per cm$^3$ of skeletal volume. For a material with a skeletal density of 4 g/cm$^3$ the 800 m$^2$/cm$^3$ skeletal volume translates to 200 m$^2$/g.

The washcoat is then heated under reducing conditions with hydrogen and ammonia, a light hydrocarbon gas, or oxygenated hydrocarbon depending on whether the desired catalyst 32, 32' is an oxynitride or oxycarbide. Optionally, the washcoat is also exposed to low partial pressures of oxygen or an oxygen containing compound after reduction to adjust the oxygen level before a passivation step. During the passivation step, the washcoat is cooled in inert gas to room temperature and with a gradually increasing oxygen environment. In one example, the oxygen concentration is increased up to ambient (~20% oxygen). To insure rapid light off when in use the resultant oxynitride or oxycarbide catalyst 32, 32' is loaded with one or more noble metals from the group consisting of Re, Ru, Rh, Pd, Os, Ir, Pt, Au. The above method is one example of forming the catalyst 32, 32' having a lattice network structure containing a transition metal skeleton with oxygen atoms scattered throughout the lattice. Given this description, one of ordinary skill in the art will recognize alternative processing methods for depositing the catalyst 32, 32' on the walls 30 of the fuel passage 24 in desired thicknesses and pore size distributions.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of controlling cooling in an aircraft system, comprising:
   endothermically cracking a fuel to increase cooling capacity of the fuel using a catalyst that includes at least one transition metal compound of at least one of carbides, nitrides, oxynitrides, oxycarbonitrides, oxycarbides, phosphides, and combinations thereof and the at least one transition metal includes at least one of zirconium, hafnium, tantalum, niobium, molybdenum, tungsten, platinum, palladium, rhodium, iridium, ruthenium, osmium, rhenium, and combinations thereof; and
   using the cracked fuel to cool a heat source comprising an aircraft component.

2. The method as recited in claim 1, wherein the endothermic cracking includes cleaving carbon-to-carbon bonds of the fuel.

3. The method as recited in claim 2, wherein the carbon-to-carbon bonds are of non-aromatic hydrocarbon chains of the fuel.

4. The method as recited in claim 1, wherein the endothermic cracking includes dehydrogenation of the fuel.

5. The method as recited in claim 1, wherein the endothermic cracking includes endothermically cracking a pre-selected type of a compositional constituent of the fuel to absorb a first amount of heat and to produce a product compositional constituent.

6. The method as recited in claim 5, wherein the endothermic cracking includes endothermically cracking the product compositional constituent to absorb a second amount of heat.

7. The method as recited in claim 6, wherein the at least one transition metal includes a first transition metal and a second, different transition metal, and the endothermic cracking includes endothermically cracking the predetermined type of the compositional constituent using a the first transition metal and endothermically cracking the product compositional constituent using the second, different transition metal.

8. The method as recited in claim 1, further comprising regenerating the catalyst to increase catalytic activity.

9. The method as recited in claim 8, wherein the regenerating includes adding an oxygenate or a nitrogen-containing compound to the fuel as a source of, respectively, oxygen or nitrogen for regenerating the catalyst.

10. The method as recited in claim 1, wherein the at least one transition metal compound further includes at least one of aluminum, scandium, titanium, vanadium, chromium, manganese, silicon, thorium, and combinations thereof.

11. The method as recited in claim 1, wherein the at least one transition metal is selected from the group consisting of tantalum, niobium, molybdenum, tungsten, and combinations thereof.

12. The method as recited in claim 1, wherein the catalyst includes at least one of niobium oxynitride, niobium oxycarbide, and molybdenum oxynitride.

13. The method as recited in claim 1, wherein the at least one transition metal compound includes molybdenum oxynitride and at least one of niobium oxynitride or niobium oxycarbide, and the endothermic cracking includes endothermically cracking a predetermined type of a compositional constituent using the at least one of niobium oxynitride or niobium oxycarbide to produce a product compositional constituent, and endothermically cracking the product compositional constituent using the molybdenum oxynitride.

* * * * *